US009846951B2

(12) United States Patent
Grams et al.

(10) Patent No.: US 9,846,951 B2
(45) Date of Patent: Dec. 19, 2017

(54) DETERMINING A CONSISTENT COLOR FOR AN IMAGE

(71) Applicant: Konica Minolta Laboratory U.S.A., Inc., San Mateo, CA (US)

(72) Inventors: Jason James Grams, Westminster, CO (US); Douglas Walter Obrecht, Longmont, CO (US); Stuart Guarnieri, Laramie, WY (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 15/087,382

(22) Filed: Mar. 31, 2016

(65) Prior Publication Data
US 2017/0287171 A1  Oct. 5, 2017

(51) Int. Cl.
G09G 5/02 (2006.01)
G06T 11/00 (2006.01)
G06T 7/40 (2017.01)
G06K 9/00 (2006.01)

(52) U.S. Cl.
CPC ............ *G06T 11/001* (2013.01); *G06T 7/408* (2013.01); *G06K 9/00409* (2013.01); *G06K 2209/01* (2013.01); *G06T 2207/30176* (2013.01)

(58) Field of Classification Search
CPC ........... G06K 2209/01; G06K 9/00456; G06K 9/4652; G06T 11/001
USPC ........................................................ 345/600
See application file for complete search history.

(56) References Cited

U.S. PATENT DOCUMENTS

| 5,455,600 | A | 10/1995 | Friedman et al. | |
| 6,021,196 | A | 2/2000 | Sandford, II et al. | |
| 6,891,969 | B2 | 5/2005 | Revill | |
| 7,450,268 | B2 | 11/2008 | Martinez et al. | |
| 2001/0030770 | A1* | 10/2001 | Ohashi | H04N 1/4076 358/465 |
| 2004/0021790 | A1* | 2/2004 | Iga | H04N 1/04 348/333.12 |
| 2004/0140964 | A1* | 7/2004 | Wang | G06F 3/03545 345/179 |
| 2008/0123945 | A1 | 5/2008 | Andrew et al. | |
| 2008/0291503 | A1* | 11/2008 | Gu | G06T 11/001 358/452 |
| 2008/0297815 | A1* | 12/2008 | Dalrymple | H04N 1/608 358/1.9 |
| 2009/0021527 | A1 | 1/2009 | Chang | |
| 2009/0161172 | A1* | 6/2009 | Mizutani | G06T 5/40 358/466 |
| 2012/0081548 | A1* | 4/2012 | Zhang | H04N 7/183 348/143 |
| 2015/0106755 | A1* | 4/2015 | Moore | G06F 3/0484 715/765 |

FOREIGN PATENT DOCUMENTS

JP  H11-313213 A  11/1999
WO  03/034340 A2  4/2003

* cited by examiner

Primary Examiner — Kimberly A Williams
(74) Attorney, Agent, or Firm — Osha Liang LLP

(57) ABSTRACT

A method may include obtaining an image that includes a connected component that includes a set of pixels, calculating a representative color for the set of pixels, mapping the representative color to an application color in an application color palette of an application, and generating an electronic document that includes a revised version of the connected component in the application color.

20 Claims, 6 Drawing Sheets

DETERMINING A CONSISTENT COLOR FOR AN IMAGE

BACKGROUND

Writing boards (e.g., whiteboards, blackboards, etc.) are used in many different settings (e.g., academic, corporate, non-profit, residential, etc.). Text, drawings, charts, graphs, etc. may be placed on writing boards to communicate ideas during lectures, training, brainstorming sessions, etc. In order to electronically memorialize these ideas, a photograph or printout of the writing board may be taken and image processing (e.g., optical character recognition (OCR), stroke recognition, reconstruction, etc.) may be executed to extract the contents of the writing board from the image.

In an image that includes the writing board, the pen strokes on the writing board may cause variations in color due to variations in pressure while writing, the writer's technique or style, the amount of ink remaining in a marker, residues of previous images on the writing board, a worn pen tip, irregular ink distribution, etc. Similar variations in color may occur in a scanned image due to artifacts introduced during the scanning process, variable lighting on a written source as it was scanned, etc.

A user may prefer a consistent rendering of color, rather than applying subtle color variations that are likely the result of "noise factors" such as those listed above. The user's likely intent is to use a few colors, rather than many shades of the same color. It is unlikely that a user would want such inconsistencies to be maintained in an electronic document that is generated based on the image.

SUMMARY

In general, in one aspect, the invention relates to a method for image processing. The method comprises: obtaining an image that includes a connected component that includes a set of pixels, calculating a representative color for the set of pixels, mapping the representative color to an application color in an application color palette of an application, and generating an electronic document that includes a revised version of the connected component in the application color.

In general, in one aspect, the invention relates to a system for image processing. The system comprises: a buffer storing an image that includes a connected component that includes a set of pixels, a color engine that calculates a representative color for the set of pixels and maps the representative color to an application color in an application color palette of an application, and a document synthesizer that generates an electronic document that includes a revised version of the connected component in the application color.

In general, in one aspect, the invention relates to a non-transitory computer readable medium storing instructions for image processing. The instructions comprising functionality to: obtain an image that includes a connected component that includes a set of pixels, calculate a representative color for the set of pixels, map the representative color to an application color in an application color palette of an application, and generate an electronic document that includes a revised version of the connected component in the application color.

Other aspects of the invention will be apparent from the following description and the appended claims.

DETAILED DESCRIPTION

Figure 1:
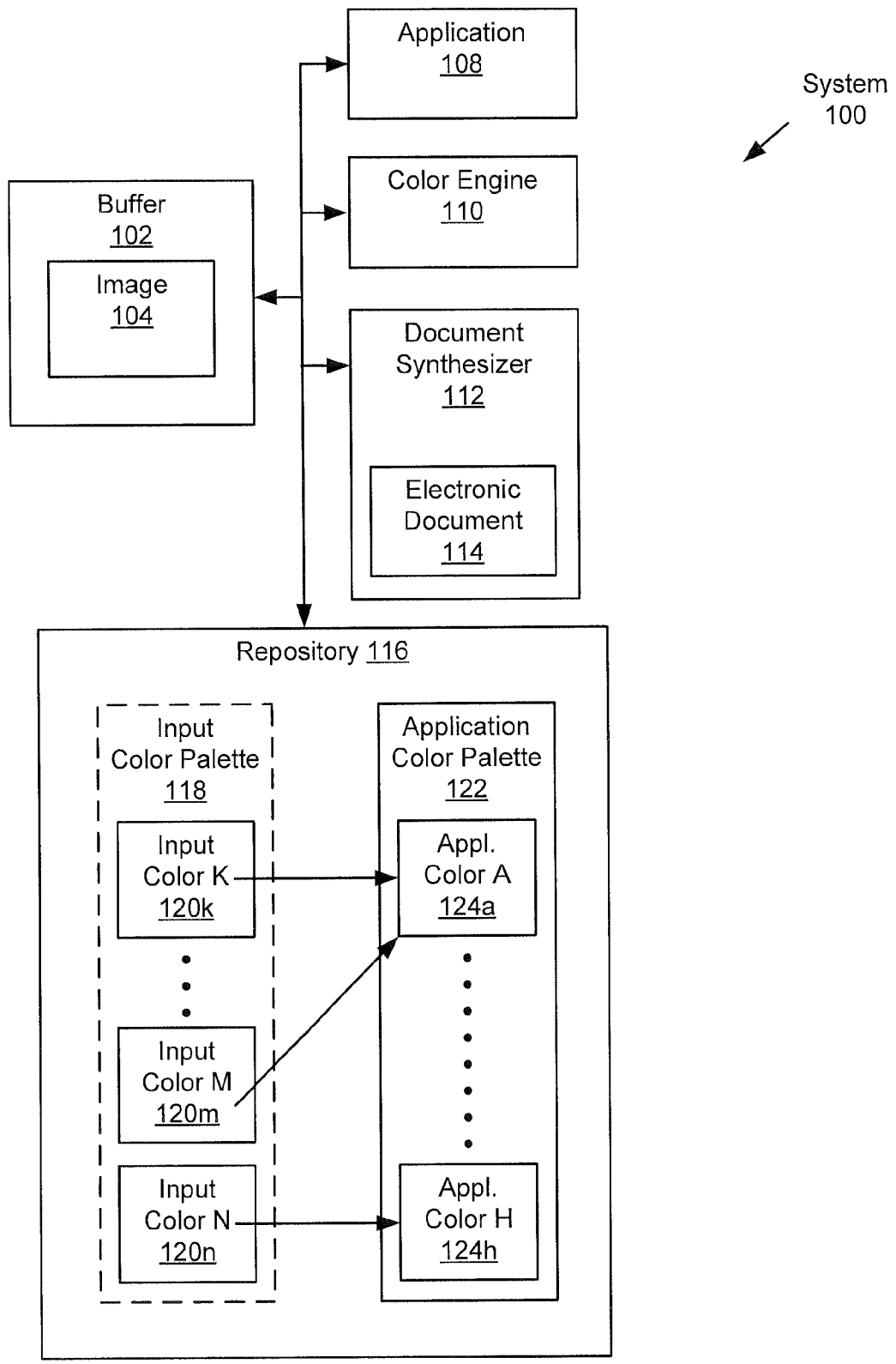
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, a non-transitory computer readable medium, and a system for image processing. An image having one or more connected components is obtained. Each connected component may correspond to a continuous pen marking on a writing board within the image. Examples of connected components include the perimeter of a shape on the writing board, a portion of a text character on the writing board, an entire text character on the writing board, an entire word on the writing board, etc. A representative color (e.g., mean color) for the connected component may be mapped to an application color in an application color palette. This mapping may include an additional step where the representative color is first mapped to an input color of an input color palette, wherein the input color is linked to the application color. The input color palette may include the set of marker colors used to draw on a whiteboard. An electronic document comprising a revised version of the connected component in the application color may be generated. The electronic document is in a format that is compatible with the application having the application color palette. The revised version of the connected component is effectively all pixels of the connected component set to application color.

FIG. 1 shows a system (100) in accordance with one or more embodiments of the invention. As shown in FIG. 1, the system (100) has multiple components including a buffer (102), an application (108), a color engine (110), a document synthesizer (112), and a repository (116). Each of these components (102, 108, 110, 112, 116) may be located on the same computing device (e.g., personal computer (PC), laptop, tablet PC, smart phone, server, mainframe, cable box, kiosk, etc.) or may be located on different computing devices connected by a network of any size and any topology having wired and/or wireless segments.

In one or more embodiments of the invention, the system (100) includes the buffer (102). The buffer (102) may be implemented in hardware (i.e., circuitry), software, or any combination thereof. The buffer (102) may store an image (104) composed of one or more connected components. As discussed above, the image (104) may include a writing board and each connected component of the image (104) may correspond to a continuous pen marking on the writing board. That is, a connected component may be determined structurally, based on the structural connectivity of the component, that is, whether the pixels of the connected component may be drawn by a continuous pen marking. The image (104) may be a digital photograph of a hardcopy document or whiteboard. The image (104) may also be a scan of a hardcopy document. Additionally or alternatively, the image (104) may be downloaded from any source (e.g., website). Further, the image (104) may be of any size and in any format (e.g., JPEG, GIF, BMP, etc.).

Each connected component of the image (104) may be composed of multiple pixels, where each pixel has a color value that may be represented in one or more color spaces. For example, the red, green, blue (RGB) color space represents colors as a linear sum of red, green and blue components, and is often found in systems that use a CRT to display images. The hue, saturation, lightness (HSL) and hue, saturation, value ("value" is sometimes referred to as "brightness") (HSV) color spaces provide a more intuitive, user-friendly representation of color than a sum of RGB values, and are commonly used when a user is required to select and/or compare colors via a user interface. For example, in the context of an HSL color space, a user may select a hue, which roughly corresponds to what humans perceive as color, and then adjust the saturation, which roughly corresponds to the "colorfulness" of the color, as well as adjusting the color's lightness.

In one or more embodiments of the invention, the system (100) includes the color engine (110). The color engine (110) may be implemented in hardware (i.e., circuitry), software, or any combination thereof. The color engine (110) may include functionality to calculate a representative color for the pixels of a connected component. This calculation may first require that a mask for the image (104) be generated. A mask is effectively a binary image generated by applying a thresholding operation to the image (104). Those skilled in the art, having the benefit of this detailed description, will appreciate that by aggressively setting the threshold, the noise and faded portions (e.g., faded edges) of the connected component do not appear in the mask (e.g., they are set to zero). For each non-zero remaining pixel in the mask, there is a corresponding pixel in the image (104). The color values of these pixels in the image (104) are used to calculate the representative color for the connected component. For example, in RGB space, the representative color may be a 3-tuple, with one element being the average of the red values of the corresponding pixels in the image (104), one element being the average of the green values of the corresponding pixels in the image (104), and one element being the average of the blue values of the corresponding pixels in the image (104).

In one or more embodiments of the invention, the color engine (110) includes functionality to map a representative color to an application color (discussed below) of an application color palette. This may include converting both the representative color and the application colors from their native color space to the same color space (e.g., HSL, HSV), and then determining the application color having the shortest distance to the representative color.

Additionally or alternatively, the color engine (110) may also include functionality to map a representative color to an input color (discussed below) in an input color palette (discussed below), where the input color is linked in advance to one of the application colors. For example, the input color palette may include the small number of marker colors that are used to draw on a whiteboard. Each one of these marker colors may be pre-linked to an application color. The selected input color may have the shortest distance of all the input colors to the representative color in a color space (e.g., HSL, HSV, etc.).

The application (108) may be any software application that can generate or display an electronic document (e.g., a word processing document, a spreadsheet, a slide show, an image, a web page, etc.). The application (108) may utilize an application color palette having any number of colors to generate or display the electronic document. The application color palette may be a default color palette that is generated by the developer of the application (108). Additionally or alternatively, the application color palette is any color palette generated by anyone that is compatible with the application (108).

In one or more embodiments of the invention, the system (100) includes the document synthesizer (112). The document synthesizer (112) may be implemented in hardware (i.e., circuitry), software, or any combination thereof. The document synthesizer (112) may include functionality to generate an electronic document (114) based on the image (104). In one or more embodiments, the generated electronic document (114) includes a revised version of the connected component from the image (104). For example, every pixel of the revised connected component may be set to the mapped application color. Additionally or alternatively, if the connected component is a hand-drawn word, the revised version of the connected component may correspond to a set of text characters extracted from the image (104) using intelligent character recognition (ICR).

In one or more embodiments, the repository (116) may be any type of storage unit and/or device (e.g., a file system, database, collection of tables, or any other storage mechanism) for storing data. Further, the repository (116) may include multiple different storage units and/or devices. The multiple different storage units and/or devices may or may not be of the same type or located at the same physical site. In one or more embodiments, the repository (116) stores one or more (optional) input color palettes (118). An input color palette (118) may be composed of expected input colors (120k-120n). For example, the input color palette (118) may correspond to the input colors (120k-120n) of a set of markers used for writing on a writing board. In one or more embodiment, the repository (116) stores one or more application color palettes (122) having multiple application colors (124a-124h). As discussed above, the application color palette (122) may be a default color palette for application (108) or a custom color palette that is compatible with the application (108). In one or more embodiments, each input color (120k-120n) and each application color (124a-124h) may be represented by a name of a color, a value of a color in a color space (e.g., RGB color space or HSL color space) and/or any other representation of a color.

In one or more embodiments, each input color (120k-120n) in the input color palette (118) is linked to an application color (124a-124h) in the corresponding application color palette (122). Multiple input colors (120k-120n) in the input color palette (118) may be linked to the same application color (124a-124h) in the corresponding application color palette (122). For example, in FIG. 1, input color K (120k) and input color M (120m) are both linked to application color A (124a). The number of input colors (120k-120n) in the input color palette (118) may be much greater than the number of application colors (124a-124h) in the application color palette (122). For example, the application colors (124a-124h) may simply be black, white and a few shades of grey, while the input colors (120k-120n) may span the color spectrum. Conversely, the number of input colors (120k-120n) in the input color palette (118) may be much less than the number of application colors (124a-124h) in the application color palette (122). For example, there may be several shades of blue in an application color palette (122), but only one shade of blue in an input color palette (118). In this case, it would be undesirable to propagate unintended inconsistencies in the input color blue to the several of shades of blue in the output electronic document (114). Thus, by first associating a representative color with an input color palette (118), the input color will be determined consistently, and then mapped to the desired shade of blue in the corresponding application color palette (122).

In one or more embodiments, the input colors (120k-120n) in the input color palette (118) may be added to the application color palette (122). An input color palette (118) may be linked to multiple application color palettes (122) (e.g., application color palettes (122) used in multiple electronic document (114) formats). In one or more embodiments, an input color palette (118), as well as the link between an input color palette (118) and an application color palette (122) may be defined by a user or any third party in a configuration file or setting.

In one or more embodiments of the invention, the repository (116) contents are configured for ease of data retrieval, modification, re-organization, and deletion. In one or more embodiments, the repository (116) contents may be accessed via a Database Management System (DBMS), which is a software application that provides an interface for users to define, create, query, update, or administer databases. The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

In one or more embodiments, the connected component in the image (104) may be but one component in an aggregate connected component. An aggregate connected component is a connected component composed of multiple connected components of different colors. For example, assume the image (104) included a triangle and each side of the triangle had a different color. The triangle is the aggregate connected component while each side is a connected component in itself. An aggregate connected component may be identified by calculating a representative color from the pixels of the candidate connected component, and then calculating the standard deviation of the color values of the pixels relative to the representative color. If the standard deviation exceeds a threshold (i.e., the standard deviation is large), the candidate connected component is deemed to be an aggregate connected component. In one or more embodiments, an aggregate connected component is decomposed into individual connected components for analysis.

While FIG. 1 shows a configuration of components, other configurations may be used without departing from the scope of the invention. For example, various components may be combined to create a single component. As another example, the functionality performed by a single component may be performed by two or more components. Although FIG. 1 shows the system (100) as having five components (102, 108, 110, 112, 116), in other embodiments, the system (100) may have more or fewer components. For example, the system (100) may include a scanner or a smart phone with a digital camera to capture the original image.

Figure 2:
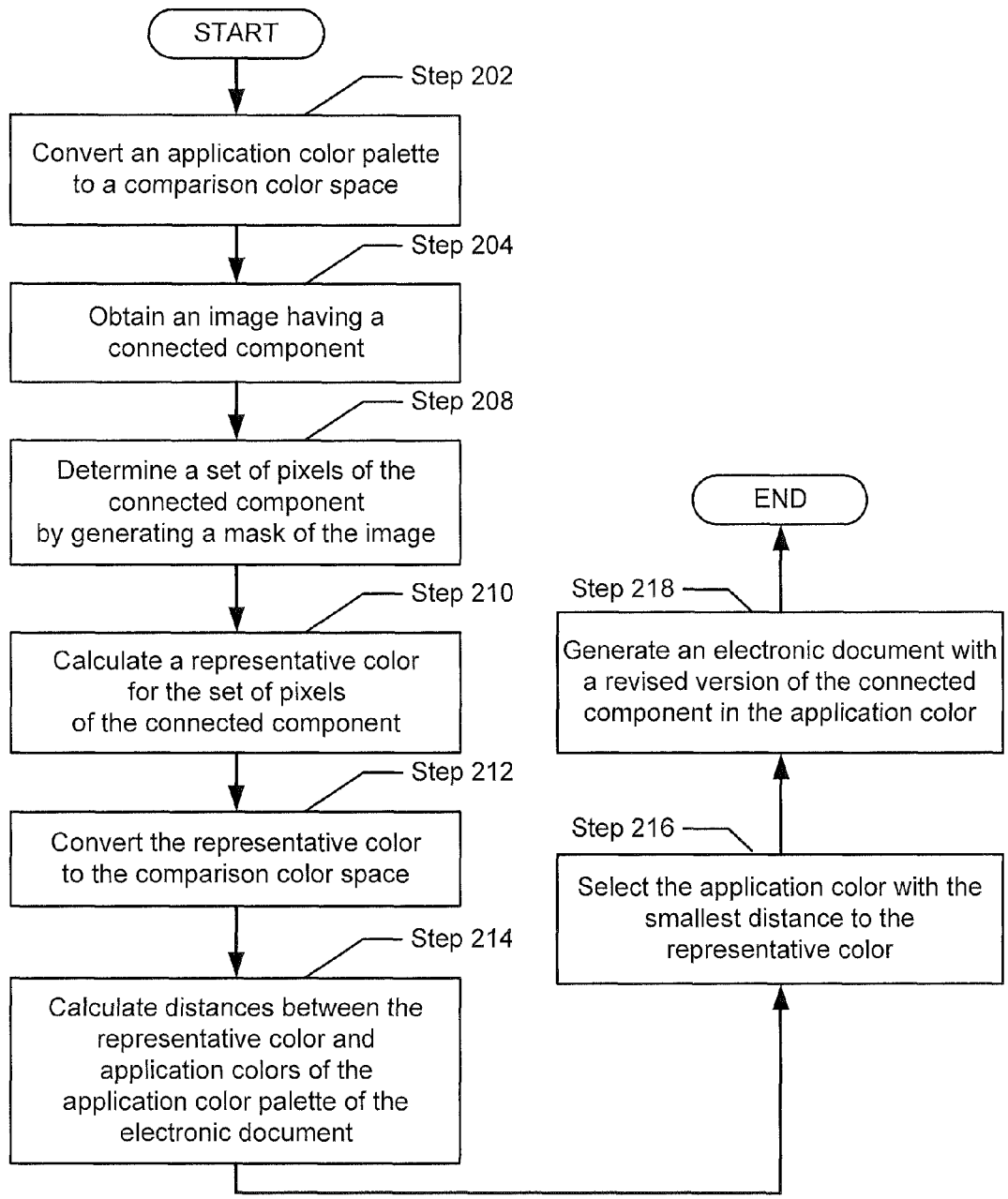
FIG. 2 and FIG. 3 show flowcharts in accordance with one or more embodiments of the invention.

FIG. 2 shows a flowchart in accordance with one or more embodiments of the invention. The flowchart depicts a process for image processing. One or more of the steps in FIG. 2 may be performed by the components (102, 108, 110, 112, 116) of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 202, an application color palette is converted to a comparison color space. As discussed above, the application color palette is a default color palette for or a custom color palette that is compatible with an application for generating or displaying electronic documents. Each color in the application color space is converted from its native color space to a comparison color space. The comparison color space is a color space where it is possible to measure (i.e., calculate) how similar or how different two colors are. In one or more embodiments, the comparison color space is HSL or HSV. Those skilled in the art, having the benefit of this detailed description, will appreciate that this conversion step is not necessary if the application color palette is already in the comparison color space.

In Step 204, an image is obtained. The image may be obtained from a digital camera or from a scanner. Additionally or alternatively, the image may be downloaded from a server. In one or more embodiments, the image may include the contents of a writing board. Accordingly, the image may include one or more connected components, where each connected component is hand-drawn on the writing board in the image. As discussed above, each connected component may correspond to a continuous pen marking on the writing board within the image.

In Step 208, a set of pixels are determined for the connected component in the image. This may include generating a mask for the image. As discussed above, a mask is effectively a binary image generated by applying a thresholding operation to the image. Those skilled in the art, having the benefit of this detailed description, will appreciate that by aggressively setting the threshold, the noise and faded portions (e.g., faded edges) of the connected component do not appear in the mask (e.g., they are set to zero). For each non-zero remaining pixel in the mask, there is a corresponding pixel in the image. These corresponding pixels in the image are the determined set of pixels.

In Step 210, a representative color is calculated for the set of pixels. In one or more embodiments of the invention, the representative color may be calculated as an average of the color values of the set of pixels in the connected component. Other statistical calculations for the representative color are also possible. For example, when an RGB color space is used to represent the color value of each pixel in the connected component, calculating the representative color may include averaging the red values of each pixel of the set of pixels, averaging the green values of each pixel of the set of pixels, and averaging the blue values of each pixel of the set of pixels.

In Step 212, the representative color is converted to the same color space used above in Step 202 to represent the color values of the application colors in the application color palette. In one or more embodiments, the comparison color space is HSL or HSV.

In Step 214, the distance between the representative color and each application color of the application color palette is calculated. In one or more embodiments, the distance is calculated as a weighted Euclidean distance. That is, the squared individual differences between the respective components (e.g., hue, saturation and lightness, when using the HSL color space) of the color space are each multiplied by weighting factors. In one or more embodiments, the hue component of the color space may be weighted more heavily than the other components of the color space (e.g., the weight of the hue may be double the weight of the saturation and the lightness in an HSL color space. For example, distance=0.5*H+0.25*S+0.25*L, where H, S and L are the squared differences between the hue, saturation and lightness components, respectively).

In Step 216, the application color with the smallest distance to the representative color in the color space is selected. In one or more embodiments, when the smallest distance exceeds a threshold, the representative color itself may be selected to be the application color. In other words, the representative color may be so unique that not even the closest application color is a match. Accordingly, the representative color may be added to the application palette.

In Step 218, an electronic document is generated. The electronic document includes a revised version of the connected component from the image. For example, every pixel of the revised connected component may be set to the selected application color (i.e., Step 216). Additionally or alternatively, if the connected component is a hand-drawn word, the revised version of the connected component may correspond to a set of text characters extracted from the image using intelligent character recognition (ICR). The electronic document is compatible with the application. In other words, the application can be used to display, print, and/or edit the electronic document.

Although the process in FIG. 2 only mentioned a single connected component, those skilled in the art, having the benefit of this detailed description, will appreciate that the image may have any number of connected components. In such embodiments, Steps 208-216 may be performed for each connected component. The generated electronic document in Step 218 may have a revised version of each connected component.

Figure 3:
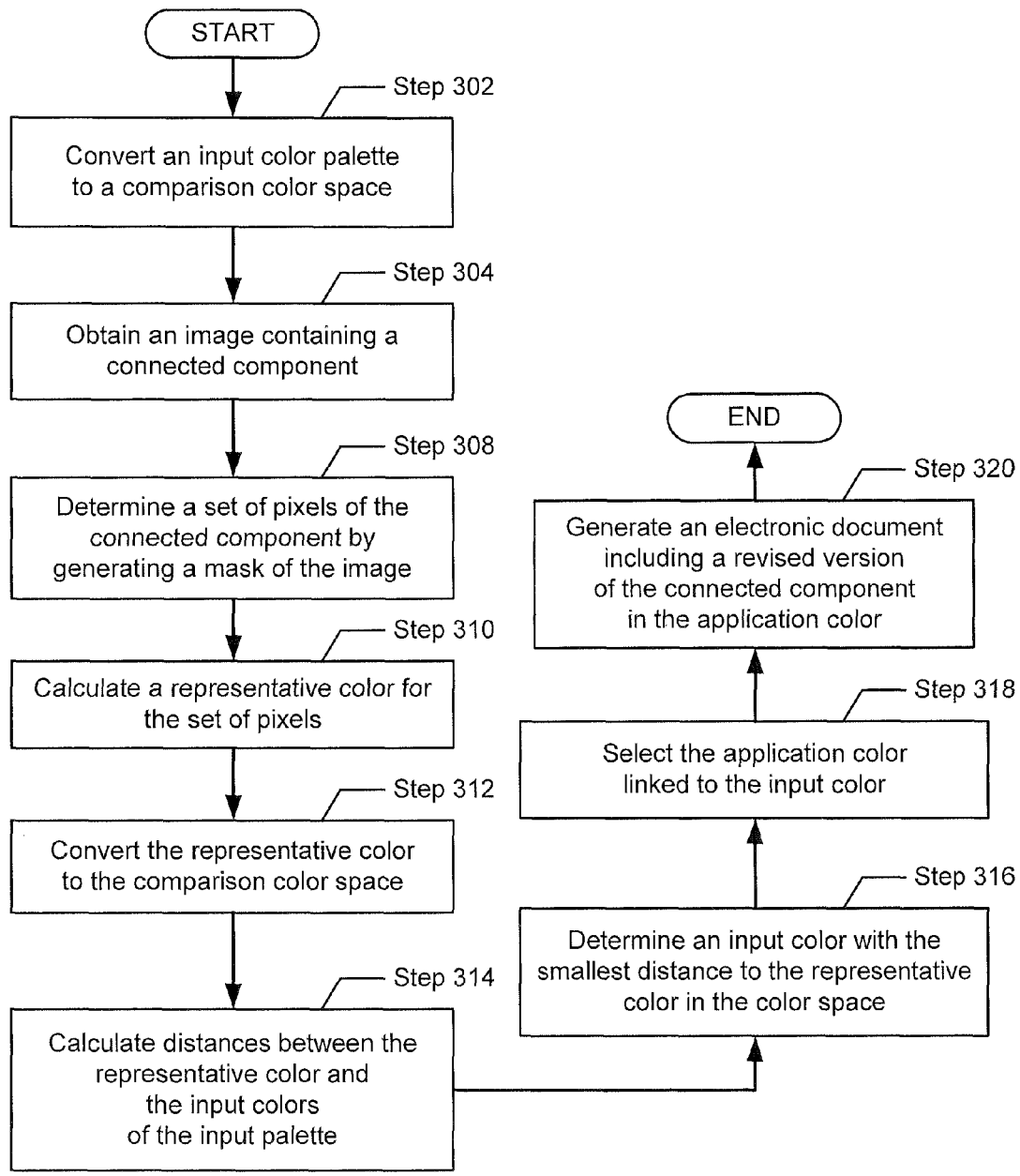

FIG. 3 shows a dual-palette flowchart (in contrast to the single-palette flowchart of FIG. 2) in accordance with one or more embodiments of the invention. The flowchart depicts a process for image processing. One or more of the steps in FIG. 3 may be performed by the components (102, 108, 110, 112, 116) of the system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 302, an input color palette is converted from its native color space to a comparison color space. The input color palette includes a set of input colors. These input colors may correspond to the expected marker colors used to draw on a writing board. Accordingly, the number of input colors may be small (e.g., 4). The comparison color space is a color space where it is possible to measure (i.e., calculate) how similar or how different two colors are. In one or more embodiments, the comparison color space is HSL or HSV. Those skilled in the art, having the benefit of this detailed description, will appreciate that the native color space might be the comparison color space (e.g., HSL, HSV) and thus no conversion is needed.

Step 304, Step 308, Step 310, and Step 312 may be essentially the same as Step 204, Step 208, Step 210, and Step 212, respectively, as discussed above in reference to FIG. 2.

In Step 314, the distance between the representative color and each input color of the input color palette is calculated. In one or more embodiments, the calculation may be performed in the HSL color space. In one or more embodiments, the distance is calculated as a weighted Euclidean distance, as discussed above in reference to Step 214. In Step 316, the input color with the smallest distance to the representative color in the color space is determined.

In Step 318, the application color linked to the input color is selected. Specifically, each input color is linked to one of the application colors of the application color palette. This linking may be executed at any time. For example, the input colors and the application colors may be linked prior to obtaining the image (i.e., prior to Step 304). Accordingly, once the input color is determined (i.e. Step 316), the application color can easily be selected because it is already linked to the input color.

In Step 320, an electronic document is generated. The electronic document includes a revised version of the connected component from the image. For example, every pixel of the revised connected component may be set to the selected application color (i.e., Step 218). Additionally or alternatively, if the connected component is a hand-drawn word, the revised version of the connected component may correspond to a set of text characters extracted from the image using intelligent character recognition (ICR). The electronic document is compatible with the application. In other words, the application can be used to display, print, and/or edit the electronic document.

Although the process in FIG. 3 only mentions a single connected component, those skilled in the art, having the benefit of this detailed description, will appreciate that the image may have any number of connected components. In such embodiments, Steps 308-318 may be performed for each connected component. The generated electronic document in Step 320 may have a revised version of each connected component.

Figure 4:
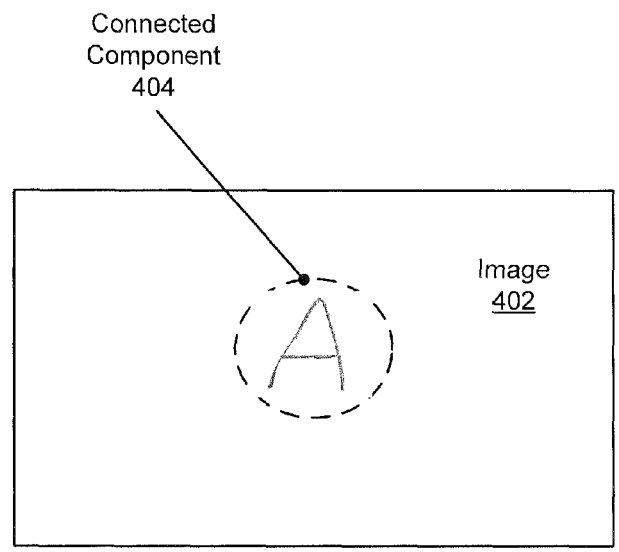
FIG. 4 shows an implementation example in accordance with one or more embodiments of the invention.
Figure 5A:
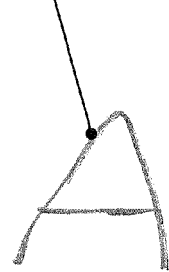
FIGS. 5A-5C show an implementation example in accordance with one or more embodiments of the invention.
Figure 5B:
Figure 5C:
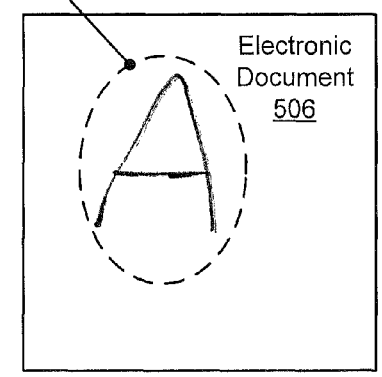

FIG. 4 shows an implementation example in accordance with one or more embodiments. As shown in FIG. 4, there exists an image (402) having a connected component (404). The image (402) is of a whiteboard and the connected component (404) is hand-drawn on the whiteboard. The connected component (404) is the hand-drawn text character "A". FIG. 5A, FIG. 5B, and FIG. 5C show an implementation example in accordance with one or more embodiments. FIG. 5A shows a magnified version of the connected component (404). Not all the pixels that make up the connected component are of the same color. This inconsistency is due to variations in pressure while writing, the writer's technique or style, the amount of ink remaining in a marker, residues of previous images on the writing board, a worn pen tip, irregular ink distribution, etc. In other words, although the connected component (404) has been hand-drawn with a single marker (e.g., blue), the connected component (404) appears to be made up of different colors (e.g., various shades of blue).

FIG. 5B shows a mask (504) generated from the image (404) in accordance with one or more embodiments of the invention. The mask (504) is effectively a binary image generated by applying a thresholding operation to the image (404). As show in FIG. 5B, both the background and many pixels of the connected component are set to zero, while the remaining pixels of the connected component are set to one. Those skilled in the art, having the benefit of this detailed description, will appreciate that by aggressively setting the threshold, the noise and faded portions (e.g., faded edges) of the connected component (404) do not appear in the mask (e.g., they are set to zero) (504). Moreover, for each non-zero pixel in the mask (504), there exists a corresponding pixel in the connected component (404). The representative color for the connected component (404) is calculated using these corresponding pixels. For example, the representative color may be the average of the color values of the pixels in the connected component (404) that correspond to the non-zero pixels in the mask (504). Assume there exists an application color that is close (e.g., smallest distance) to the representative color. Moreover, the application color is but one color in an application color palette utilized by an application (not shown).

FIG. 5C shows an electronic document (506) that has been generated. The electronic document (506) is compatible with the application. The electronic document (506) includes a revised version of the connected component (508). The revised version of the connected component (508) is set to the application color. In other words, all pixels that make up the connected component (404) are set to the same color (i.e., the determined application color) in the revised connected component (508). The revised version of the connected component (508), unlike the connected component (404), is a consistent color.

Figure 6:
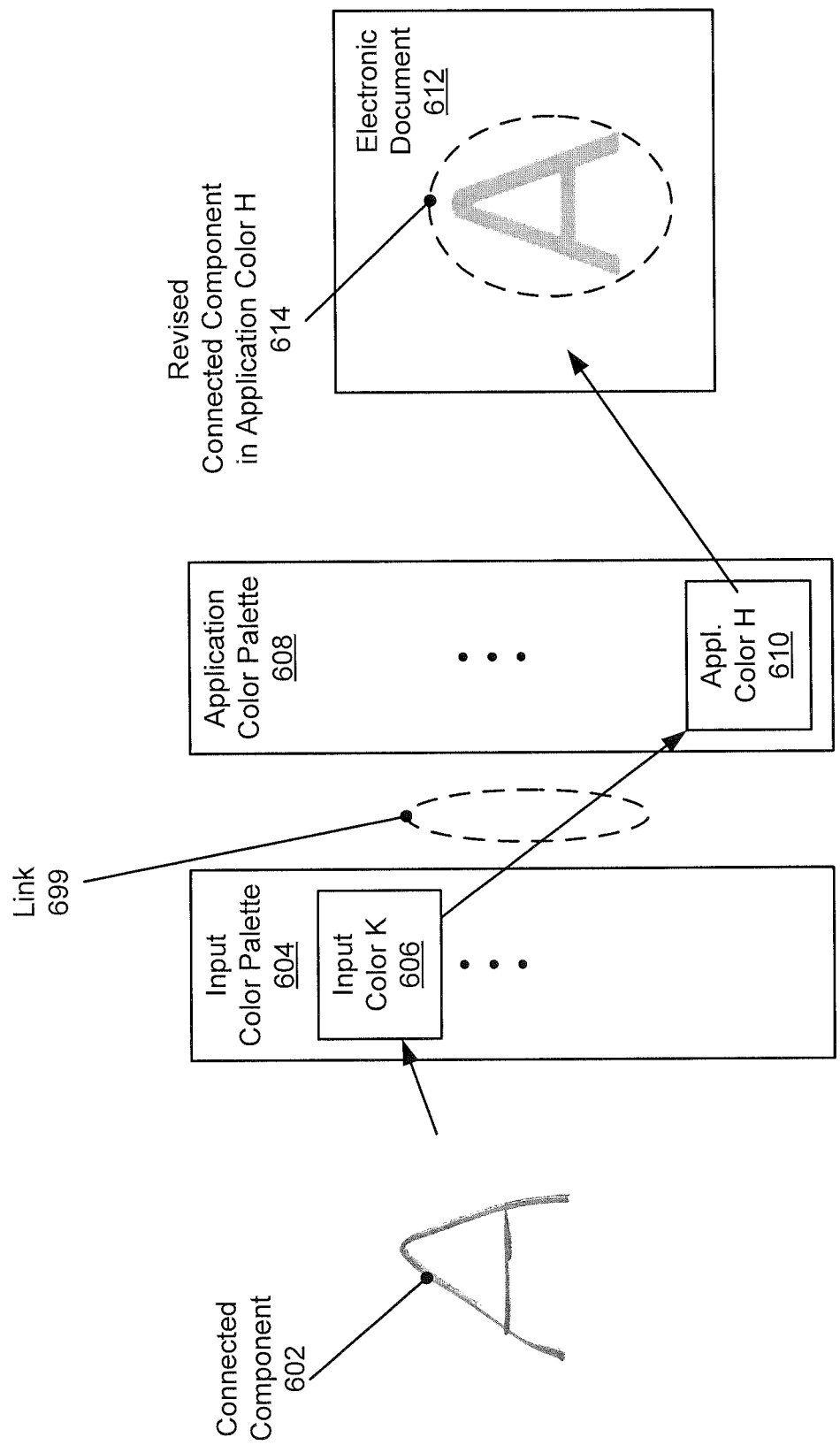
FIG. 6 shows an implementation example in accordance with one or more embodiments of the invention.

FIG. 6 shows an implementation example in accordance with one or more embodiments of the invention. FIG. 6 shows a connected component (602) in an image. The image is of a whiteboard and the connected component (602) is hand-drawn using a maker. Like connected component (404), connected component (602) is a hand-drawn version of the text character "A". Not all the pixels that make up the connected component (602) are of the same color. This inconsistency is due to variations in pressure while writing, the writer's technique or style, the amount of ink remaining in a marker, residues of previous images on the writing board, a worn pen tip, irregular ink distribution, etc. In other words, although the connected component (602) has been hand-drawn with a single marker (e.g., blue), the connected component (602) appears to be made up of different colors (e.g., various shades of blue).

FIG. 6 also shows an input color palette (604) with multiple input colors (e.g., Input Color K (606)). Each input color is one of the marker colors that could be used to draw on the whiteboard in the image. Accordingly, one of the input colors in the input color palette (604) corresponds to the marker used to draw the connected component (602). By calculating a representative color for pixels in the connected component (602), and converting both the representative color and the input colors to a comparison color space, it is possible to determine which input color (i.e., Input Color K (606)) is closest to the representative color of the connected component (602).

Still referring to FIG. 6, there exists an application color palette (608) having multiple application colors (e.g., Application Color H (610)). The application color palette (608) is a default color palette used by an application to generate and/or display electronic documents. As also shown in FIG. 6, there is a link (699) between the input color K (606) and the application color H (610). This link (699) may have been generated before the connected component (602) was even drawn. Once the input color (606) having the smallest distance to the representative color is determined, the corresponding application color (610) is also known because of the link (699).

FIG. 6 also shows an electronic document (612) that has been generated. The electronic document (612) is compatible with the application. The electronic document (612) includes a revised version of the connected component (614). The revised version of the connected component (614) is set to the application color (610). In other words, all pixels that make up the connected component (602) are set to the same color (i.e., the determined application color H (610)) in the revised connected component (614). The revised version of the connected component (614), unlike the connected component (602), is a consistent color. Those skilled in the art, having the benefit of this detailed description, will appreciate that it is effectively a two-step process to go from the representative color to the application color in the example of FIG. 6.

Figure 7A:
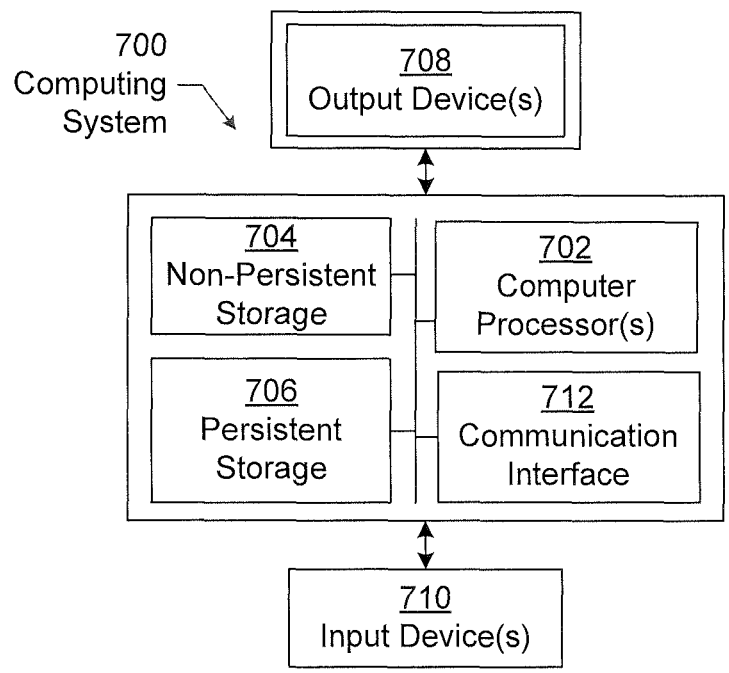
FIG. 7A and FIG. 7B show computing systems in accordance with one or more embodiments of the invention.

Embodiments of the invention (e.g., components (102, 108, 110, 112, 116)) may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7B:
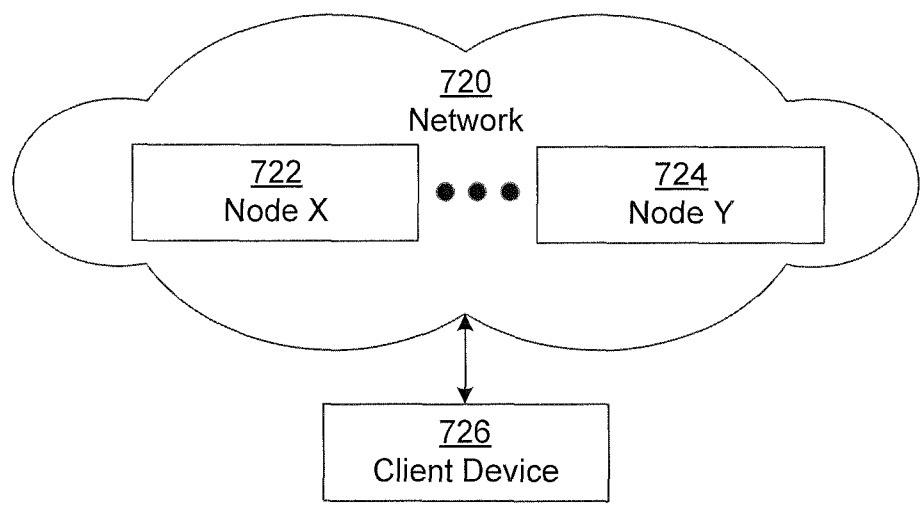

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The above description of functions present only a few examples of functions performed by the computing system of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating an electronic document by processing an image, comprising:
   obtaining an image comprising a connected component comprising a plurality of pixels,
   wherein the image further comprises a writing board and the connected component that is drawn on the writing board with a marker, and
   wherein the plurality of pixels comprise a plurality of colors due to noise factors associated with the marker;
   calculating, by a processor, a representative color for the plurality of colors;
   mapping, by the processor, the representative color to an application color in an application color palette of an application; and
   generating, by the processor, the electronic document comprising a revised version of the connected component entirely in the application color.

2. The method of claim 1, wherein calculating the representative color comprises:
   averaging a plurality of red values in the plurality of pixels;
   averaging a plurality of blue values in the plurality of pixels; and
   averaging a plurality of green values in the plurality of pixels.

3. The method of claim 1, wherein mapping the representative color comprises:
   converting the representative color to a color space;
   converting a plurality of application colors in the application color palette to the color space; and
   calculating a plurality of distances between the representative color and the plurality of application colors in the color space,
   wherein the application color has the smallest distance to the representative color in the color space.

4. The method of claim 1, wherein mapping the representative color comprises:
   converting the representative color to a color space;
   converting a plurality of application colors in the application color palette to the color space;
   calculating a plurality of distances between the representative color and the plurality of application colors in the color space;
   determining a smallest distance of the plurality of distances; and
   adding the representative color to the application color palette in response to the smallest distance exceeding a threshold, wherein the application color is the representative color added to the application color palette.

5. The method of claim 1, wherein mapping the representative color comprises:
   converting the representative color to a color space;
   converting a plurality of input colors in an input color palette to the color space;
   calculating a plurality of distances between the representative color and the plurality of input colors in the color space; and
   determining an input color having the smallest distance to the representative color in the color space, wherein the input color is linked to the application color.

6. The method of claim 5, wherein:
the plurality of input colors correspond to a plurality of markers for drawing on the writing board.

7. The method of claim 5, wherein:
the color space is hue, saturation, and lightness (HSL) space; and
the plurality of distances are weighted Euclidean distances.

8. The method of claim 1, further comprising:
determining the plurality of pixels by generating a mask of the image.

9. The method of claim 1, wherein the revised version of the connected component is generated by applying image character recognition to the connected component, and wherein the connected component is a hand-drawn text character.

10. The method of claim 1, wherein:
the connected component is a component of an aggregate connected component in the image;
the aggregate connected component is identified by:
 calculating a standard deviation of rgb values in the aggregate connected component relative to the representative color; and
 determining that the standard deviation exceeds a threshold; and
the aggregate connected component is decomposed into a plurality of connected components comprising the connected component.

11. A system for generating an electronic document from an image, comprising:
a memory storing the image comprising a connected component comprising a plurality of pixels,
 wherein the image further comprises a writing board and the connected component that is drawn on the writing board with a marker, and
 wherein the plurality of pixels comprise a plurality of colors due to noise factors associated with the marker; and
a processor connected to the memory that:
 calculates a representative color for the plurality of colors;
 maps the representative color to an application color in an application color palette of an application; and
 generates the electronic document comprising a revised version of the connected component entirely in the application color.

12. The system of claim 11, wherein the processor maps the representative color by:
converting the representative color to a color space;
converting a plurality of application colors in the application color palette to the color space; and
calculating a plurality of distances between the representative color and the plurality of application colors in the color space,
wherein the application color has the smallest distance to the representative color in the color space.

13. The system of claim 11, wherein the processor maps the representative color by:
converting the representative color to a color space;
converting a plurality of input colors in an input color palette to the color space;
calculating a plurality of distances between the representative color and the plurality of input colors in the color space; and
determining an input color having the smallest distance to the representative color in the color space,
wherein the input color is linked to the application color.

14. The system of claim 13, wherein:
the color space is HSL space; and
the plurality of distances are weighted Euclidean distances.

15. The system of claim 11,
wherein the buffer further comprises a mask of the image, and
wherein the processor further determines the plurality of pixels by generating the mask.

16. A non-transitory computer readable medium storing computer readable program code embodied therein that:
obtains an image comprising a connected component comprising a plurality of pixels,
wherein the image further comprises a writing board and the connected component that is drawn on the writing board with a marker, and
wherein the plurality of pixels comprise a plurality of colors due to noise factors associated with the marker;
calculates a representative color for the plurality of colors;
maps the representative color to an application color in an application color palette of an application; and
generates an electronic document comprising a revised version of the connected component entirely in the application color.

17. The non-transitory computer readable medium of claim 16, wherein mapping the representative color comprises:
converting the representative color to a color space;
converting a plurality of application colors in the application color palette to the color space; and
calculating a plurality of distances between the representative color and the plurality of application colors in the color space,
wherein the application color has the smallest distance to the representative color in the color space.

18. The non-transitory computer readable medium of claim 16, wherein mapping the representative color comprises:
converting the representative color to a color space;
converting a plurality of input colors in an input color palette to the color space;
calculating a plurality of distances between the representative color and the plurality of input colors in the color space; and
determining an input color having the smallest distance to the representative color in the color space,
wherein the input color is linked to the application color.

19. The non-transitory computer readable medium of claim 18, wherein:
the color space is HSL space; and
the plurality of distances are weighted Euclidean distances.

20. The non-transitory computer readable medium of claim 16, further storing computer readable program code embodied therein that:
determines the plurality of pixels by generating a mask of the image.

* * * * *